United States Patent [19]

Steiner et al.

[11] Patent Number: 5,528,248

[45] Date of Patent: Jun. 18, 1996

[54] PERSONAL DIGITAL LOCATION ASSISTANT INCLUDING A MEMORY CARTRIDGE, A GPS SMART ANTENNA AND A PERSONAL COMPUTING DEVICE

[75] Inventors: Glenn C. Steiner, Los Altos; Lloyd H. Banta, Palo Alto; Matthew M. Trask, San Jose, all of Calif.

[73] Assignee: Trimble Navigation, Ltd., Menlo Park, Calif.

[21] Appl. No.: 293,048

[22] Filed: Aug. 19, 1994

[51] Int. Cl.⁶ .............................. G01S 5/02; H04B 7/185
[52] U.S. Cl. .......... 342/357; 364/231.2; 364/DIG. 857.1
[58] Field of Search ..................... 342/357, 385, 342/386; 364/705.05, 705.01, 231–231.31

[56] References Cited

U.S. PATENT DOCUMENTS

| | | | |
|---|---|---|---|
| 4,958,837 | 9/1990 | Russell | 273/237 |
| 5,014,982 | 5/1991 | Okada et al. | 273/435 |
| 5,059,970 | 10/1992 | Raubenheimer et al. | 342/451 |
| 5,214,757 | 5/1993 | Mauney et al. | 395/161 |
| 5,302,947 | 4/1994 | Fuller et al. | 364/705.05 |
| 5,389,934 | 2/1995 | Kass | 342/357 |
| 5,412,573 | 5/1995 | Barnea et al. | 364/449 |
| 5,446,465 | 8/1995 | Diefes et al. | 342/357 |
| 5,470,233 | 11/1995 | Fruchterman et al. | 434/112 |

*Primary Examiner*—Gregory C. Issing
*Attorney, Agent, or Firm*—David R. Gildea

[57] ABSTRACT

A Personal Digital Location Apparatus for displaying a geographical location as an icon on a map. The apparatus includes a GPS Smart Antenna for determining the geographical location, a personal computing device including a display, a processing system including a standard software operating system such as DOS, Windows, Macintosh, or Geoworks, and a map application program capable of running in the operating system. The GPS Smart Antenna includes an internal battery and a power sensor for sensing the connection of an external power source. The GPS Smart Antenna receives power from the external power source when the power sensor senses that the external power source is connected and receives power from the internal battery when the power sensor senses that the external power source is not connected. An input select switch controlled by a Request to Send signal from the personal computing device enables the GPS Smart Antenna to use a single UART chip for receiving a command/control signal from the personal computing device and a differential GPS (DGPS) signal from a DGPS radiowave receiver.

15 Claims, 4 Drawing Sheets

PERSONAL DIGITAL LOCATION ASSISTANT INCLUDING A MEMORY CARTRIDGE, A GPS SMART ANTENNA AND A PERSONAL COMPUTING DEVICE

FIELD OF THE INVENTION

This invention relates to multiple uses of memory cartridges and serial interfaces for Personal Digital Assistants.

BACKGROUND OF THE INVENTION

Personal Digital Assistant (PDA) is a generic name for a handheld personal computing device having a volume in the range of 200 to 1200 cubic centimeters. PDAs having as much computing power as some desktop personal computers are newly available from many manufacturers. Competition among of manufacturers of PDAs for market share in this new market has driven prices low enough to be attractive for applications where location and computing power have been needed but have not been affordable previously.

The new PDAs have a user interface including a liquid crystal display, a user entry mechanism, memory for application programs, and an interface for external electronic equipment. Existing PDAs include one or more Personal Computer Memory Card International Association (PCMCIA) interface cards that insert into slots in the PDA for the application program memory. Some PDAs include a speaker. The user entry typically includes an array of keys, a touch screen on the display, or both. The PCMCIA memory cartridge stores pre-coded software data and/or program instructions for an application and plugs into the PCMCIA slot in the PDA to give the appearance of a single, packaged unit. The processing system in the PDA includes a microprocessor, memory, pre-coded software in the memory, and associated logic hardware to operate the elements in the PDA, the memory cartridge, and the serial interface.

A PDA has an appearance that is similar to existing handheld, electronic video game devices. A limitation of handheld game devices is that the microprocessors used in the processing systems are not powerful enough to run application programs written in general purpose, high level languages such as C. A software application intended for a handheld game must be written in a language intended for the specific microprocessor used in the game processing system. An existing software application intended for another microprocessor must be re-written in order to use the applications with a handheld game device. A second limitation of handheld game devices is that the processing systems cannot run standard operating systems such as DOS, Windows, Macintosh, or Geoworks. Software applications that run in standard operating systems must also be re-written to be used in a handheld game device.

Printed maps are available for viewing almost all features that have geographical locations. A limitation of printed maps is that a user must manually sort through the entire map in order to find the geographical features that are proximate to his location. Each time a user travels to a new location, he must repeat this sort. Some maps include attributes of map features, such as an aviation map that includes airport signal frequencies or runway lengths. Typically, a separate page or a separate printed map for each set of attributes is required and must be manually sorted by the user.

Electronic maps have recently become available to replace paper maps for some applications. A map database is stored in a memory storage device as a bit map or raster, or as vectors that point to a map character. In a raster map database, data stored sequentially in memory represents the intensity and/or color of sequential pixels of a map. A map character is an alphanumeric or other determined shape. In a vector map database, data stored in memory represents the coordinates, intensity, character, and/or color of pixels of a map. The map database may also store characters that are superimposed on the display of the map, where characters are in ASCII or a similar format. Multiple colors or gray scales require additional data stored in memory for each pixel. Raster maps are easier to develop and less likely to have errors, but vector maps can be compressed into less memory and are more easily sorted for features and attributes. A combination of raster, vector, and character mapping may be used. Where the map database is too large for the memory storage device, the database may be divided into a plurality of modules, sometimes overlapping. An electronic display such as a liquid crystal display (LCD), electroluminescent (EL), cathode ray tube (CRT), or other similar electronic technology is used to display the map to the user. Keys or other user input devices are used to zoom in and out and to pan the map.

A limitation of an electronic map is that the electronic map features or attributes must be manually sorted by zooming and panning unless location is known and electrically communicated to the map application. Raubenhiemer et al. in U.S. Pat. No. 5,059,970 disclose an invention for the manual entry of location to an electronic map, where the invention electronically sorts the map so that a portion of the map proximate to the location is displayed. Provision is made for manual entry of speed, heading, and drift. A limitation of the Raubenhiemer et al. invention is that the location is susceptible to error in the manual entry and to accumulation of additional error as the user travels from his initial entered location if the entered speed, heading, and drift are not actual speed, heading, and drift.

Many electronic location determination systems are available or have been proposed to provide electronic location information to a user equipped with a location determination receiver. Ground-based location determination systems, such as Loran, Omega, TACAN, Decca, U.S. Airforce Joint Tactical Information Distribution System (JTIDS Relnav), or U.S. Army Position Location and Reporting System (PLRS), use the intersection of hyperbolic surfaces to provide location information. A representative ground system is LORAN-C discussed in *LORAN-C User Handbook,* Department of Transportation, U.S. Coast Guard, Commandant Instruction M16562.3, May 1990, which is incorporated by reference herein. LORAN-C provides a typical location accuracy of approximately 400 meters. A limitation of a LORAN-C location determination system is that not all locations in the northern hemisphere, and no locations in the southern hemisphere, are covered by LORAN-C. A second limitation of LORAN-C is that the typical accuracy of approximately 400 meters is insufficient for many applications. A third limitation of LORAN-C is that weather, local electronic signal interference, poor crossing angles, closely spaced time difference hyperbolas, and skywaves frequently cause the accuracy to be significantly worse than 400 meters.

Other ground-based location determination devices use systems that were developed primarily for communications, such as cellular telephone, FM broadcast, and AM broadcast. Some cellular telephone systems provide estimates of location, using comparison of signal strengths from three or more sources. FM broadcast systems having subcarrier signals can provide estimates of location by measuring the phases of the subcarrier signals. Kelley et al. in U.S. Pat. No. 5,173,710 disclose a system that allows determination of a location of a vehicle. FM subcarrier signals are received from three FM radio stations with known locations but unknown relative phases by signal processors at the vehicle and at a fixed station having a known location. The fixed station processor determines the relative phase of the signals transmitted by the three FM radio stations and transmits the relative phase information to the vehicle. The vehicle processor determines its location from the FM subcarrier signal phases and from the relative phase information it receives. A limitation of cellular systems and FM subcarrier systems for location determination is that they are limited to small regions, with diameters of the order of 20–50 km.

Satellite-based location determination systems such as Global Positioning System, GPS, and the Global Orbiting Navigational System, GLONASS, use the intersection of spherical surface areas to provide location information with a typical accuracy of 100 meters, anywhere on or near the surface of the earth. The satellite-based location determination systems include satellites having signal transmitters to broadcast location information and control stations on earth to track and control the satellites. Location determination receivers process the signals transmitted from the satellites and provide location information to the user.

The Global Positioning System (GPS) is part of a satellite navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will have line of sight to most points on the Earth's surface, and line of sight access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 sidereal days. The signal frequencies of both GPS and GLONASS are in L-band (1 to 2 GHz).

Because the signals from the satellites pass through the tropospheric for only a short distance, the accuracy of satellite location determination systems such as GPS or GLONASS is largely unaffected by weather or local anomalies. A limitation of GLONASS is that it is not clear that the Russian Republic has the resources to complete and to maintain the system for full world wide 24 hour coverage. The inherent accuracy of the GPS position measured by a commercial GPS receiver is approximately 20 meters. However, the United States Government currently degrades the accuracy of GPS positions for commercial users with Selective Availability, SA. With SA the GPS position accuracy of a commercial GPS receiver is approximately 100 meters.

Differential Global Positioning System, DGPS, is a service for enhancing the accuracy of the GPS position. The DGPS comprises the Global Positioning System together with a GPS reference station receiver situated at a known position. DGPS error correction information is derived by taking the difference between the measurements made by the GPS reference station and the expected measurement at the known position of the reference station. DGPS error correction information can be in the form of GPS satellite pseudorange offsets or GPS position offsets. If GPS position offsets are used, the GPS satellites used in the calculation of the GPS position must be included as part of the DGPS error correction information. A processor in a "differential-ready" GPS receiver applies the DGPS error correction information to enhance the GPS position to an accuracy in the range of 10 meters to a less than one meter.

Two types of DGPS exist, postprocessed and realtime. In postprocessed systems the DGPS error correction information and a user's GPS position information are processed after the user has completed his application. In realtime systems the DGPS error correction information is transmitted to the GPS user in a DGPS radio wave signal and processed by a differential-ready GPS receiver as the application progresses. Realtime processing is desirable for many applications because the enhanced accuracy of DGPS is available to the GPS user while he is working in the field. Realtime broadcast of DGPS error correction information is available from many sources, both public and private, including Coast Guard RDF beacon and commercially operated FM broadcast subcarrier. A DGPS radio wave receiver is required to receive the DGPS radio wave signal containing the DGPS error correction information and pass the DGPS error corrections to the differential-ready GPS receiver.

Many applications of GPS including mineral surveying, mapping, adding attributes or features to maps, finding sites on a map, vehicle navigation, airplane navigation, marine navigation, field asset management, geographical information systems, and others require the enhanced accuracy that is available with DGPS. For instance, a 20 to 100 meter error could lead to unintentional trespassing, make the return to an underground asset difficult, or put a user on the wrong block while walking or driving in a city. These applications require a computer to store and process data, retain databases, perform calculations, display information to a user, and take input from a user entry. For instance the user may need to store a map database, display a map, add attributes to features on the map, and store these attributes for geographical information. Or he may need to store and display locations or calculate range and bearing to another location.

GPS is used by many professionals engaged in navigation and surveying fields such as marine navigation, aircraft piloting, seismology, boundary surveying, and other applications where accurate location is required or where the cost of GPS is small compared to the cost of a mistake in determining location. Some professionals engaged in mobile fields such as utilities, insurance, ranching, prospecting, ambulance driving, trucking, delivery, police, fire, real estate, forestry, and other mobile applications use GPS to save time in their work. GPS is also used for personal travel such as hiking, biking, horseback riding, yachting, fishing, driving in personal cars, and other travel activities. However, most mobile professional and personal users of GPS find that location coordinates as provided by GPS are of limited use unless the proximate map features and/or attributes are sorted and displayed in the same coordinate system.

In many aviation, marine, vehicle, and pedestrian navigation applications, the navigator uses personal navigation equipment that he carries with him when he changes airplanes, boats, or motor vehicle to save the cost of having multiple sets of navigation equipment or to prevent theft of the equipment. The navigation equipment for these applications needs to be easily installed and removed. Most existing GPS receivers are designed to be hard mounted onto a platform so that the equipment is not easily removed. The Federal Aviation Agency (FAA) is rightly concerned that unqualified navigation equipment carried in aircraft may interfere with the proper operation of the aircraft. For this reason the FAA has a time consuming and expensive testing requirement to qualify navigation equipment. However, the FAA has traditionally allowed extra navigation equipment to be carried aboard so long as the equipment is not hard mounted to the aircraft or powered from the aircraft power supply. Existing handheld GPS receivers operate from internal batteries and are easy to install and remove, but have limited or no computing power, databases, or map display and cannot use applications programmed in standard operating systems.

Many systems using handheld computers, having computing power for maps and for standard operating systems, have been coupled to GPS Smart Antennas. Wireless, infrared, serial, parallel, and PCMCIA interfaces have been used to interconnect the handheld computer and the GPS Smart Antenna. Differential-ready GPS Smart Antennas having an input to receive signals representative of DGPS error corrections are commercially available. A GPS receiver built onto a type II PCMCIA card is commercially available. A differential-ready GPS Smart Antenna with an integral DGPS receiver has been reduced to practice. A DGPS receiver built onto a PCMCIA card and a system including a GPS receiver on a PCMCIA card, a DGPS receiver on a PCMCIA card, and a handheld computer has been reduced to practice. None of the systems having a handheld computer and a GPS location determination device include a separate memory storage device that is used exclusively for an application program. None of these systems explicitly discuss a memory storage device that may be conveniently reprogrammed with a new application. A limitation of these systems is that a user cannot easily change his application program without purchasing duplicate GPS hardware.

What is needed is an handheld apparatus having a GPS antenna and receiver to provide location information, capable of using standard operating systems such as DOS, Windows, Macintosh, or Geoworks to run existing applications, and capable of running programs written in high level languages such as C to provide a mobile professional, a personal traveler, or a navigator with a display of his location and relative locations and the attributes of map features proximate to him. The apparatus needs to operate from an internal source of power, be convenient to install and remove, and have a replaceable memory storage device used exclusively to store applications programs or a memory storage device that may be conveniently reprogrammed. Location accuracy within 10 meters or less needs to be available to the user.

SUMMARY OF THE INVENTION

A first object of the invention is to provide an Personal Digital Location Assistant apparatus that includes a Personal digital computing device (PDA), a memory cartridge that connects to the PDA, and a GPS Smart Antenna. The PDA provides a visual display, an optional speaker, one or more keys or touchscreen user entry devices, an interconnection to the GPS Smart Antenna, and an internal source of power. The GPS Smart Antenna receives GPS satellite signals and provides GPS location the PDA.

A second object of the invention is to provide an electronic map application system, including map features and attributes of features, where the features and attributes of the map proximate to the location of the GPS Smart Antenna, or to another selected location are displayed to a user. The electronic map application program is stored in the memory cartridge.

A third object of the invention is to provide an Personal Digital Location Assistant apparatus that includes a Personal digital computing device (PDA), a memory storage device built into the PDA, and a GPS Smart Antenna. The PDA provides a visual display, an optional speaker, one or more keys or touchscreen user entry devices, an interconnection to the GPS Smart Antenna, and an internal source of power. The GPS Smart Antenna receives GPS satellite signals and provides GPS location the PDA.

A fourth object of the invention is to provide an electronic map system including map features and attributes of features, where the features and attributes of the map proximate to the location of the GPS Smart Antenna, or to another selected location are displayed to a user. The electronic map application program is stored in the memory storage device. A connection on the PDA enables a user to re-program the application in the memory storage device.

A fifth object of the invention is to provide a GPS Smart Antenna having an internal battery as a source of power and an external power connector. A power supply in the GPS Smart Antenna automatically uses power from the external power connector when an external source of power is sensed, and automatically turns internal power off after a selected elapsed time or when commanded from the PDA.

A sixth object of the invention is to provide a DGPS Smart Antenna having the capability of receiving DGPS error correction information from a DGPS receiver and receiving control information from the PDA through a serial input device having only a single input.

These and other objects, features, and advantages of the invention are set forth or implicit in the following drawings and detailed description.

DETAILED DESCRIPTION OF THE INVENTION

Figure 1:
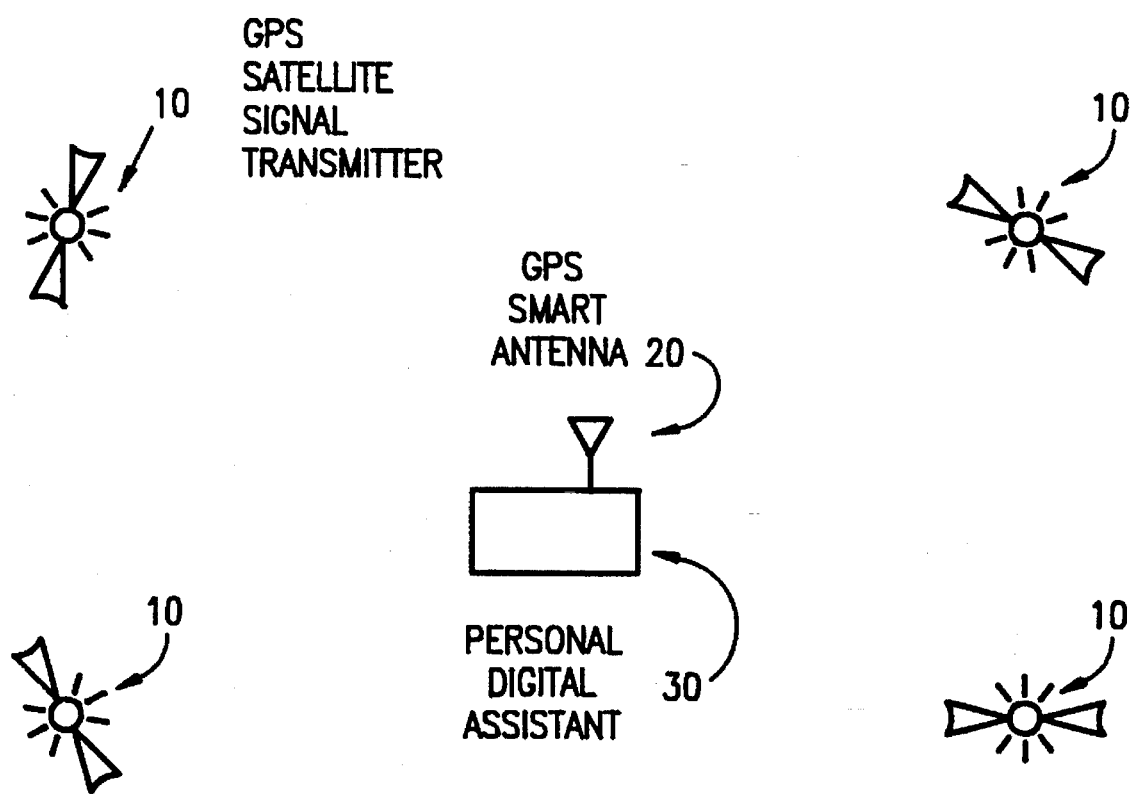
FIG. 1 illustrates a satellite-based GPS location determination system according to the invention.

FIG. 1 illustrates a satellite location determination system using Global Positioning System (GPS) satellite signal transmitters 10. Each GPS satellite signal transmitter 10 transmits a spread spectrum L1 carrier signal having a frequency=1575.42 MHz. The L1 signal from each satellite signal transmitter 10 is binary phase shift key (BPSK) modulated by a Coarse/Acquisition (C/A) pseudo-random noise (PRN) code having a clock or chip rate of $f0=1.023$ MHz. Location information is transmitted at a rate of 50 baud. The PRN codes allow use of a plurality of GPS satellite signal transmitters 10 for determining an observer's position and for providing location information. A signal transmitted by a particular GPS satellite is selected by generating and correlating the PRN code for that particular satellite signal transmitter 10 with a GPS signal received from that satellite. All C/A PRN codes used for GPS satellite signals are known and are stored and/or generated in a GPS receiver. A bit stream from the GPS satellite signal transmitter 10 includes an ephemeris location of the GPS satellite signal transmitter 10, an almanac location for all GPS satellites, and correction parameters for ionospheric signal propagation delay, and clock time of the GPS satellite signal transmitter. Accepted methods for generating the C/A-code are set forth in the document GPS Interface Control Document ICD-GPS-200, published by Rockwell International Corporation, Satellite Systems Division, Revision A, 26 Sep. 1984, which is incorporated by reference herein.

Figure 2:
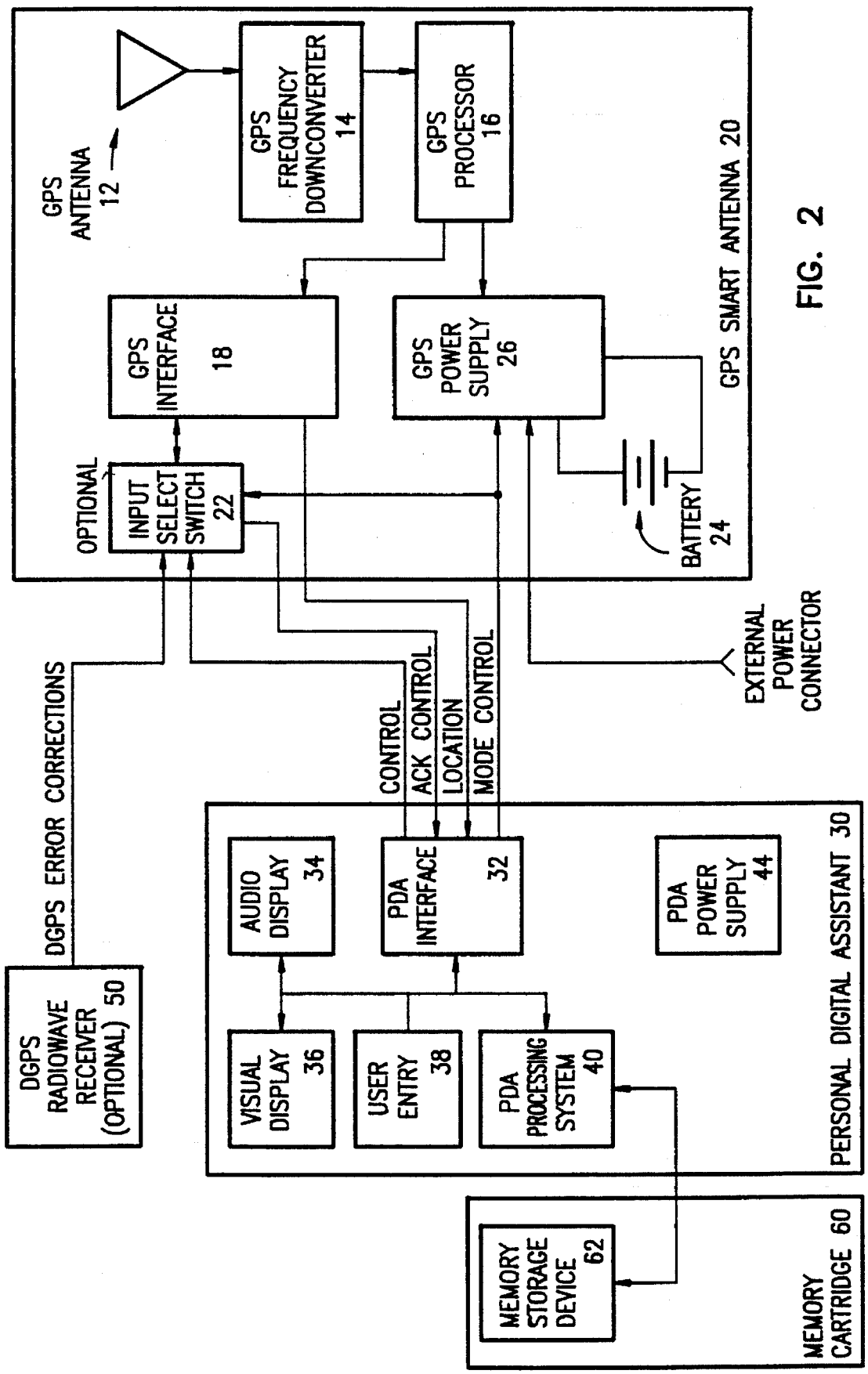
FIG. 2 illustrates a block diagram of an embodiment of a Personal Digital Location Assistant including a PDA, a memory cartridge, and a GPS Smart Antenna according to the invention.

FIG. 2 illustrates a block diagram of an embodiment of the invention, including a Personal Digital Assistant (PDA) 30, a memory cartridge 60, and a GPS Smart Antenna 20. The PDA 30 has a processing system 40 which is capable of running applications written in general purpose, high level languages such as C. A software application written in a high level language can normally be ported to run in the PDA processing system 40. The engineering time to port a software application is significantly less than the engineering time to re-write the application. A second distinguishing feature is that the PDA 30 is capable of running standard operating systems such as DOS, Windows, Geoworks, and Macintosh. Some PDAs can use DOS, Windows and Geoworks, but not Macintosh, and some PDAs can use Macintosh, but not DOS, Windows, or Geoworks. DOS, Windows, Geoworks, and the Macintosh operating system each allow the PDA 30 to run an immense existing library of applications.

Optionally, the GPS Smart Antenna 20 is "differential-ready" to apply differential GPS (DGPS) error correction information to improve accuracy of a GPS determined location. The memory cartridge 60 includes at least one memory storage device 62 to store pre-coded software instructions and data, to receive digital signals for commands and addresses and as digital signals, and to provide the pre-coded software instructions and data as digital signals. The memory storage device 62 is a masked Read Only Memory (ROM), One Time Programmable (OTP) Read Only Memory, Programmable Read Only Memory (PROM), Electronically Programmable Read Only Memory (EPROM), Electronically Erasable Programmable Read Only Memory (EEPROM), Flash memory, or Random Access Memory (RAM) or other similar electronic component that stores information. In the present embodiment, memory cartridge 60 is compatible with the Personal Computer Memory Card Interface Association (PCMCIA) standard.

The PCMCIA standard calls for a card approximately 85.6 mm by 54 mm with as many as 68 electrical socket connections in two rows of 34 on each row on 1.27 mm centers to fit into a slot in a host computer or other electrical device. Three card varieties are used that have differing thicknesses, type I is approximately 3.3 mm, type II is approximately 5 mm, and type III is approximately 10 mm. Types I and II are describes in the version 2 PCMCIA standard while type III is commonly known to use the same electrical interface specifications but is not contained within the version 2 standard. The PCMCIA bus comprises up to 26 address lines, up to 16 data lines, power at 3.3, 5, 12 volts, ground, enables, protects, ready/busy, interrupt request, IO, refresh, reset, register select, battery voltage detects, card detect, wait, audio digital wave form, and card status changed lines. Additional capabilities are available through lines that are reserved or undefined or by redefining existing lines. Not all lines will be used or supported by any one PCMCIA compatible host or card. The PCMCIA standard is described in *Personal Computer Memory Card International Association PC Card Standard,* release 2.0, published September, 1991, by the PCMCIA in Sunnyvale, Calif. which is incorporated herein by reference.

The PDA 30 includes the processing system 40, including a microprocessor, memory, pre-coded program instructions and data stored in memory, a microprocessor bus for addresses, data, and control, an interrupt bus for interrupt signals, and associated hardware, operates in a conventional manner to receive digital signals, process information, and issue digital signals. A user interface in the PDA 30 includes a visual display 36 to visually display signals received from the processing system 40 to a user, a user entry 38 to issue signals from the user to the processing system 40, and, optionally, a speaker 34 to audibly display signals received from the processing system 40 to the user. The user entry 38 may include one or more push keys, toggle switches, proximity switches, magnetic or optical balls, soft keys on the visual display 36, microphones or a combination of any of the above used together or with other similar type user input methods. The PDA 30 sends digital signals representing addresses, data, and commands to the memory cartridge 60 and receives digital signals representing instructions and data from the memory cartridge 60. A PDA interface 32 electrically connects the processing system 40 to a GPS Smart Antenna 20. In the present embodiment, the PDA interface 32 transmits and receives serial information in RS232 or RS422 format and has a cabled mechanical connection to the GPS Smart Antenna 20. A PDA power supply 44 supplies power to at least one of the elements of the PDA 30 and to the memory cartridge 60.

The GPS Smart Antenna 20 includes a GPS antenna 12 to receive GPS satellite signals from GPS satellite transmitters 10, a GPS frequency downconverter 14 to downconvert the approximately 1.575 GHz frequency of the L1 GPS satellite signals to a lower frequency (LF) signal that is suitable for digital processing and to issue the LF to a GPS processor 16. The GPS processor 16 demodulates and decodes the LF signal and provides location information for at least one of (i) location of the GPS antenna, (ii), GPS satellite pseudoranges between the GPS satellites and the GPS antenna, (iii) rate of change of location of the GPS antenna, (iv) heading of the GPS antenna, and (v) time to a GPS interface 18. The GPS interface 18, a serial interface using RS232 or RS422 in the present embodiment, issues location information to the PDA 30. Optionally, the GPS Smart Antenna 20 and GPS processor 16 are differential-ready. An optional input select switch 22, controlled by the GPS processor 16 upon a request from the PDA 30, allows a single serial interface 18 to receive either a control signal from the PDA 30 or a DGPS error correction signal from an optional DGPS radiowave receiver 50.

A GPS power supply 26 uses an internal battery 24 or an external power source connected to an external power input to supply power for the GPS frequency downconverter 14, for the GPS processor 16, for the GPS interface 18, and for the input select switch 22. A power sensor is included in the GPS power supply 26. When the power sensor detects that an external source of power is connected, the GPS power supply 26 uses power from the external source. When the power sensor does not detect the connection of an external source, the GPS power supply 26 uses power from the internal battery 24.

A mode control signal, Request to Send (RTS) in the present embodiment, issued by the PDA interface 32 is received by the GPS power supply 26 and the input select switch 22. When mode control signal is once asserted, the GPS power supply 26 turns power on to the elements of the GPS Smart Antenna 20. Where internal batteries are used, the GPS power supply 26 turns power off when a selected time duration has elapsed or when commanded to do so by a control signal from the PDA 30. When the mode control signal is asserted, the input select switch 22 selects to receive control signals from the PDA 30 and asserts an acknowledge control signal, Clear to Send (CTS), in the embodiment. The acknowledge control signal is received by the PDA interface 32. Input select switch 22 selects DGPS error corrections and negates the acknowledge control signal when commanded by a control signal from the PDA 30. The mode control signal, a nonstandard use of RTS in the embodiment, described above enables the GPS Smart Antenna 20 in the present embodiment to receive two serial inputs—DGPS error correction signals from the DGPS radiowave receiver and processor control signals from the PDA 30 in present embodiment—through a single Universal Asynchronous/synchronous Receiver Transmitter (UART) instead of through two UARTs or a Dual Universal Asynchronous/synchronous Receiver Transmitter (DUART), thereby reducing both power consumption and cost of the GPS Smart Antenna 20 having the differential-ready option.

The optional DGPS radiowave receiver 50 receives a Differential GPS (DGPS) radio wave signal containing DGPS error correction information and passes the DGPS error corrections to the differential-ready GPS Smart Antenna 20. The DGPS error correction information uses the format of RTCM Special Committee 104 (SC104) messages as described in the *RTCM Recommended Standards for Differential NAVSTAR GPS Service*, Version 2, published in Washington, D.C., Jan. 1, 1994. Type 1 and type 9 messages contain GPS satellite pseudorange error correction information. A total of 63 messages, many of which are yet undefined, are allowed within the standard. Data transfers use RS232 or RS422, most significant bit first, asynchronous communication. Full duplex receivers are called for in the standard but are not required for broadcast reception. The GPS processor 16 in the GPS Smart Antenna 20 is differential-ready to include pre-coded software to apply the DGPS error correction information to improve the accuracy of the GPS location information.

Figure 3:
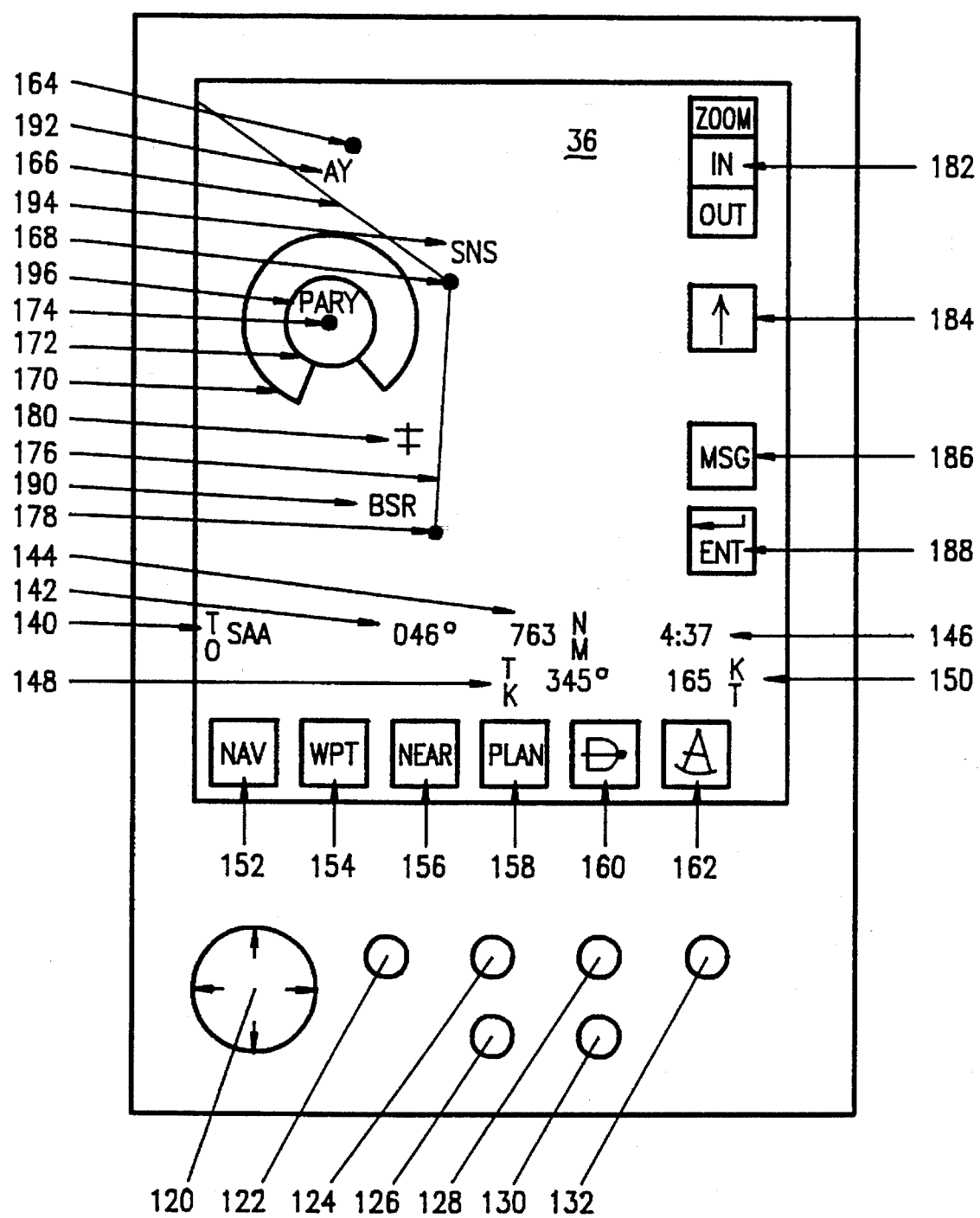
FIG. 3 illustrates an appearance of an embodiment of an aviation map on a display of a Personal Digital Location Assistant according to the invention.

FIG. 3 illustrates an appearance of an aviation map in an embodiment of the invention displaying navigation information and touch screen keys. Although an aviation map is shown in the illustration, a map for marine, land, or other environment can equally well be applied. Map features are located and displayed on the map according to a coordinate system such as latitude and longitude. Icon 180 represents the location of the GPS Smart Antenna 20, and a platform on which the GPS Smart Antenna 20 is carried, superimposed on the corresponding location coordinates used to display the features. Although an aircraft is shown in the illustration, another vehicle such as a boat, road or offroad vehicle, or pedestrian can equally well be applied. Route lines 176 and 166 show a current, desired flight path, and a next, desired flight path, respectively, for the aircraft. Waypoint 178 identified as BSR 190 is a "from" waypoint and a starting point for route 176. Waypoint 168 identified as SNS 194 is a "to" or a next waypoint and a turning point in the flight path. Airport 174 is identified as MRY (Monterey, Calif.) 196. Airport 174 is surrounded by a controlled airspace inner ring 172 and partially surrounded by a controlled airspace outer ring 170. A non-directional beacon 164 is identified as AY 192.

The user entry 38 has touchscreen keys and press keys in the present embodiment. With a touchscreen, a user enters a request by touching a designated portion of the visual display 36 with his finger or soft pointer, such as a plastic pen. The touchscreen senses the touch and causes a digital signal to be sent to the processing system indicating the touch was made. Switches such as rotary switches, toggle switches, or other switches can equally well be applied. An advantage of the touchscreen is that a label or a placement of the touchscreen, and a corresponding function of the touchscreen may be changed by request from the user any number of times without changing electrical or mechanical hardware. In the present embodiment, zoom keys 182 change scale and resolution of a map. Zooming in increases the scale so that the map is viewed with greater resolution over a lesser area of the map. Zooming out decreases the scale so that a greater area of the map is viewed with lesser resolution. Map orientation key 184 selects an orientation of a direction on the map with a direction on the visual display 36. The present embodiment includes orientations of north up or current ground track up. In the illustration in FIG. 3, ground track up is shown. Optionally, a MSG (message) key 186 requests that a message be displayed and an ENT (enter) key 188 acts to complete a entry from a user.

In the present embodiment, press keys 120 move or pan the map display up, down, right, or left according to the arrows. Press key 122 toggles between full map display and a display of touchscreen keys and map display. The touchscreen keys and map display is shown in FIG. 3. Press keys 124 and 126 increase and decrease display intensity. Press keys 128 and 130 increase and decrease display contrast. Press key 132 toggles power on and off.

In the present embodiment, user entry 38 includes touchscreen keys to control a mode for the visual display 36. In the illustration in FIG. 3, a NAV key 152 has been pressed to cause the visual display 36 to display a navigation mode. In the navigation display mode, a final destination 140 is identified as SAA (Shively airport). Bearing 42 is 046° to the final destination 140. Range 144 is 763 nautical miles to the final destination 140. Ground track 148 is 345° for the aircraft. Ground speed 150 is 165 knots for the aircraft. Estimated time enroute 146 is 4 hours and 37 minutes. In the present embodiment, a WPT (waypoint) key 154 causes the visual display 36 to display a waypoint mode including the range 152, the bearing, estimated time enroute, and estimated time of arrival to next waypoint 168. A NEAR key 156 causes the visual display 36 to display a near mode including ranges and bearings to nearby sites, such as airports, and non-directional beacons, Very high frequency Omni-Range (VOR) stations. A PLAN key 158 causes the visual display 36 to display a flight plan and to display touchscreen keys to allow a user to create a new flight plan. A "D→" 160 causes the visual display 36 to display touchscreen keys to set a new final destination. A symbol representing a sextant 162 causes the visual display 36 to display parameters, such as system status, latitude, longitude, and time.

Figure 4:
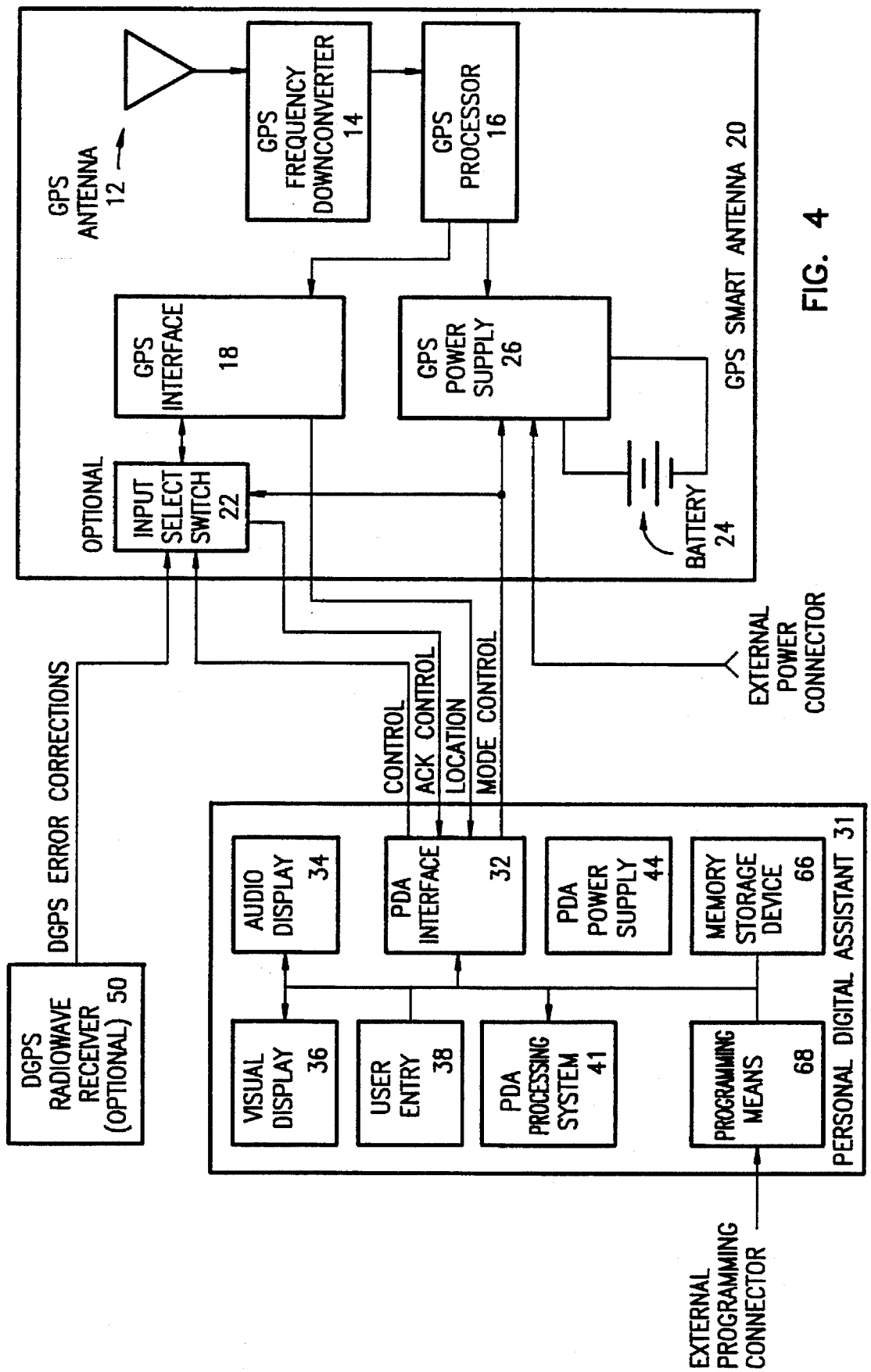
FIG. 4 illustrates a block diagram of an embodiment of a Personal Digital Location Assistant including a PDA, a memory storage device included in the PDA, and a GPS Smart Antenna according to the invention.

FIG. 4 illustrates a block diagram of an embodiment of a Personal Digital Location Assistant including a PDA 31, a memory storage device included in the PDA 61, and a GPS Smart Antenna 20 according to the invention. The PDA 31 has a processing system 41 which is capable of running applications written in general purpose, high level languages such as C. A software application written in a high level language can normally be ported to run in the PDA processing system 41. The engineering time to port a software application is significantly less than the engineering time to re-write the application. A second distinguishing feature is that the PDA 31 is capable of running standard operating systems such as DOS, Windows, Geoworks, and Macintosh. Some PDAs can use DOS, Windows and Geoworks, but not Macintosh, and some PDAs can use Macintosh, but not DOS, Windows, or Geoworks. DOS, Windows, Geoworks, and the Macintosh operating system each allow the PDA 31 to run an immense existing library of applications.

The memory storage device 66 stores pre-coded software instructions and data, receives digital signals for commands and addresses and as digital signals, and provides the pre-coded software instructions and data as digital signals. The memory storage device 66 is a flash memory, a Random Access Memory (RAM) which can be reprogrammed, including being erased and then programmed with new information, with electrical signals from an external programming source, such as a personal computer or other computing device, through programming means 68, under control of the PDA processor 41.

The PDA 31 includes the processing system 41, including a microprocessor, memory, pre-coded program instructions and data stored in memory, a microprocessor bus for addresses, data, and control, an interrupt bus for interrupt signals, and associated hardware, operates in a conventional manner to receive digital signals, process information, and issue digital signals. A user interface in the PDA 31 includes a visual display 36 to visually display signals received from the processing system 41 to a user, a user entry 38 to issue signals from the user to the processing system 41, and, optionally, a speaker 34 to audibly display signals received from the processing system 41 to the user. The user entry 38 may include one or more push keys, toggle switches, proximity switches, magnetic or optical balls, soft keys on the visual display 36, microphones or a combination of any of the above used together or with other similar type user input methods. The PDA 31 sends digital signals representing addresses, data, and commands to the memory storage device 66 and receives digital signals representing instructions and data from the memory storage device 66. A PDA interface 32 electrically connects the processing system 41 to a GPS Smart Antenna 20. In the present embodiment, the PDA interface 32 transmits and receives serial information in RS232 or RS422 format and has a cabled mechanical connection to the GPS Smart Antenna 20. A PDA power supply 44 supplies power to at least one of the elements of the PDA 31. The GPS Smart Antenna 20 and the DGPS radiowave receiver 50 are as described in FIG. 2.

Although the invention has been described in terms of a presently preferred embodiment, it is to be understood that the description of the embodiment is not to be interpreted as limiting. Various modifications will no doubt be apparent to those skilled in the art. According, it is intended that the following claims be interpreted as covering all the modifications within the spirit and scope of the invention.

We claim:

1. A Personal Digital Location Assistant comprising:

processing means, including a standard software operating system and an application program for processing global positioning system (GPS) location information according to said application program and providing navigation information based upon said application program, and including means for issuing a mode control signal and a command control signal; and a GPS Smart Antenna including input select switch means coupled to a DGPS radiowave receiver for receiving a DGPS signal including DGPS error corrections and coupled to the processing means for receiving said command control signal, said input select means for selecting one of said DGPS signal and said command control signal according to said mode control signal; wherein the GPS Smart Antenna includes means for receiving GPS satellite signals from one or more GPS Satellites where each GPS satellite issues a distinct GPS satellite signal, and for providing said GPS location information.

2. The Personal Digital Location Assistant in claim 1, wherein:

the processing means includes said operating system including one of (i) DOS, (ii) Windows, (iii) Macintosh, and (iv) Geoworks.

3. The Personal Digital Location Assistant in claim 1, further including:

a memory cartridge, coupled to the processing means, for storing map information for processing by said application program, including a PCMCIA card built according to a PCMCIA standard having: a length of about 85.6 mm by a width of about 54 mm, 68 electrical pin and socket connections arranged in 2 rows of 34 each row of about 1.27 mm on center, 8 or 16 data electrical connections for data, up to 26 electrical lines for addresses, electrical lines authorized for power, ground, enable, protect, ready/busy, and interrupt request, and a thickness of one of about 3.3 mm and about 5 mm.

4. The Personal Digital Location Assistant in claim 1, further including:

a memory cartridge, coupled to the processing means, for storing map information for processing by said application program, including a PCMCIA card built according to a PCMCIA standard having: a length of about 85.6 mm by a width of about 54 mm, 68 electrical pin and socket connections arranged in 2 rows of 34 each row of about 1.27 mm on center, 8 or 16 data electrical connections for data, up to 26 electrical lines for addresses, electrical lines authorized for power, ground, enable, protect, ready/busy, and interrupt request; and having a thickness of about 10 mm.

5. The Personal Digital Location Assistant in claim 1, wherein:

the GPS Smart Antenna includes a GPS antenna for receiving said GPS satellite signals and for issuing a responsive GPS antenna output signal; a GPS frequency downconverter connected to the GPS antenna for receiving said GPS antenna output signal and issuing a conducted GPS signal at a selected lower frequency; a GPS processor connected to the GPS frequency downconverter for receiving said GPS signal at said lower frequency and issuing a data signal including said location data to the processing system means; an internal battery; an external power connector; and a GPS power supply, including a power sensor for sensing when an external power source is connected to said external power connector, for receiving source power from said internal battery when said power sensor senses that said external power source is not connected, for receiving said source power from said external power source when said power sensor senses that said external power source is connected, and for supplying said source power for operating at least one of said GPS antenna, said GPS frequency downconverter, and said GPS processor.

6. The Personal Digital Location Assistant in claim 1, further including:

a memory storage means, coupled to the processing means, for storing map data representative of a geographical location of a map feature and a representation of an attribute of said map feature; and a display, coupled to the processing means, for receiving a display signal including map information including said map feature and said attribute when said geographical location of said map feature is proximate to said geographical location of the GPS Smart Antenna and displaying said map information in a graphical form visually perceptible by a human user; and wherein the PDA processing system means further includes said application program for selecting said map feature when said geographical location of said map feature is proximate to said geographical location of said GPS Smart Antenna and for providing said display signal.

7. The Personal Digital Location Assistant in claim 6, wherein:

said memory storage means includes said map feature drawn from the class of topographic features consisting of elevations, land areas, and water areas.

8. The Personal Digital Location Assistant in claim 6, wherein:

said memory storage means includes said map feature drawn from the class of transportation aids consisting of road maps marine charts, aviation charts, trail maps, walking path maps, and bicycling maps.

9. The Personal Digital Location Assistant in claim 6, wherein:

said memory storage means includes said map feature drawn from the class of utility lines consisting of electrical lines, water lines, and gas lines.

10. The Personal Digital Location Assistant in claim 6, wherein:

said memory storage means includes said map feature drawn from the class of boundary maps consisting of property ownership boundaries, jurisdictions of government organizations, and building zoning.

11. The Personal Digital Location Assistant in claim 6, wherein:

said said memory storage means includes said map feature drawn from the class of natural science zones consisting of animal life, vegetation, mineral deposits, and soil types.

12. The Personal Digital Location Assistant in claim 6, wherein:

said said memory storage means includes said map feature drawn from the class of safety zones consisting of hazardous wastes, fire dangers, marine hazards, and military zones.

13. The Personal Digital Location Assistant in claim 1, wherein:

the processing means includes said application program where said application program includes program code written in C language.

14. The Personal Digital Location Assistant in claim 6, wherein:

said memory storage means includes said map feature including an airport including said attribute of at least one of (i) an alphanumeric identifier, (ii) a runway length, (iii) a signal frequency, (iv) an inner control ring, and (v) an outer control ring.

15. The Personal Digital Location Assistant in claim 1, wherein:

said mode control signal is Request to Send (RTS).

* * * * *